United States Patent [19]
Morley et al.

[11] Patent Number: 5,446,585
[45] Date of Patent: * Aug. 29, 1995

[54] NIGHT VISION DEVICE WITH IMPROVED IMAGE STABILITY

[75] Inventors: Roland M. Morley; Timothy R. Goebel, both of Tempe, Ariz.

[73] Assignee: Litton Systems, Inc., Woodland Hills, Calif.

[ * ] Notice: The portion of the term of this patent subsequent to Nov. 1, 2011 has been disclaimed.

[21] Appl. No.: 86,510

[22] Filed: Jul. 1, 1993

Related U.S. Application Data

[63] Continuation-in-part of Ser. No. 59,539, May 11, 1993, Pat. No. 5,361,162.

[51] Int. Cl.$^6$ .............................................. G02B 23/00
[52] U.S. Cl. ................... 359/411; 359/412; 359/417; 351/128
[58] Field of Search ............... 359/407, 409, 411, 412, 359/417–434, 400, 350, 351, 353, 354, 600, 894; 351/128

[56] References Cited

U.S. PATENT DOCUMENTS

| | | | |
|---|---|---|---|
| 4,417,814 | 11/1983 | Doliber | 356/252 |
| 4,792,673 | 12/1988 | Blackler | 250/214 |

OTHER PUBLICATIONS

U.S. patent application Ser. No. 08/059,539, Timothy Goebel, filing date May 11, 1993.

Primary Examiner—Georgia Y. Epps
Assistant Examiner—Thomas Robbins
Attorney, Agent, or Firm—Poms, Smith, Lande & Rose

[57] ABSTRACT

An ANVIS 6 type of binocular night vision device includes a pair of night vision monocular scopes which adjustably depend from a support frame in front of a user's eyes. The support frame includes an interpupillary distance adjustment mechanism which allows placement of the monocular scopes to better achieve binocular vision with depth perception. The image quality of binocular vision afforded by the device is improved and made more durable by providing the monocular scope mounts with a dirt-shedding dry threaded engagement with their respective interpupillary adjustment shafts, as well as providing a laterally extended threaded engagement of these mounts with the adjustment shafts. As a result, wobble of the monocular scope mounts relative to the frame is significantly reduced, and wear of the component parts which over time contributes to increased wobble is also reduced.

17 Claims, 3 Drawing Sheets

NIGHT VISION DEVICE WITH IMPROVED IMAGE STABILITY

CROSS REFERENCE TO RELATED APPLICATION

The present application is a Continuation-In-Part application of prior U.S. application Ser. No. 08/059,539, filed May 11, 1993 now U.S. Pat. No. 5,361,162.

BACKGROUND OF THE INVENTION

1. Field of the Invention

The present invention relates to a night vision device. More particularly, the present invention relates to a night vision device of the ANVIS (aviator's night vision imaging system) type, including a pair of monocular night vision scopes which are mounted and associated with one another in such a way as to provide the user of the device with binocular vision, thereby allowing the user to enjoy a night-time view with depth perception. Still more particularly, the present invention relates to such an ANVIS type of night vision device in which the stability of the monocular night vision scopes on their support structure is greatly improved to virtually eliminate wobble of these scopes and to provide the user with an image of much improved stability.

2. Related Technology

A conventional binocular night vision device is known as the ANVIS, model number AN/AVS-6, hereinafter referred to as the ANVIS 6. The ANVIS 6 includes a pair of night vision monoculars suspended in front of the user's eyes by a laterally elongate frame which is rectangular in plan view. The frame is supported from a face plate or helmet which the user wears in order to support the weight of the night vision device. The conventional ANVIS 6 includes an interpupillary distance adjustment mechanism with a pair of transversely aligned rotatable shafts near the front of the frame. Each of the rotatable shafts is drivingly coupled to the other at adjacent ends, and each extends laterally within the rectangular frame above one of the monocular scopes. Each shaft defines a respective thread portion of opposite hand, and the rectangular frame slidably carries a pair of depending monocular mounts each threadably engaging one of the threaded shafts. One of the threaded shafts includes an outwardly projecting knob, rotation of which rotates both shafts and simultaneously moves the monocular mounts symmetrically together or apart to adjust interpupillary distance to the preferences of the user.

The conventional ANVIS 6 also includes a tilting mechanism which includes an elongate eccentric bushing device which is rotatable in the rectangular frame. This rotatable bushing carries the threaded shafts of the interpupillary adjustment mechanism, and moves these shafts in an arcuate path to tilt the monocular mounts relative to the rectangular frame about a slide and pivot shaft. This slide and pivot shaft is carried adjacent to the rear of the frame.

With the conventional ANVIS 6, the interpupillary adjustment mechanism is lubricated with grease and is protected from environmental dust by four bellows type dust seals which extend along the threaded shafts between the monocular mounts and the frame. At the monocular mounts, the conventional ANVIS 6 includes a respective counter bore, which encroaches on the threaded length of the monocular mount, and into which the adjacent end of the bellows dust seal is received.

A persistent complaint about the conventional ANVIS 6 night vision device is that the monocular scopes wobble from side to side on the frame. This wobble is accentuated when the night vision device is used in an environment of high vibration, such as in a helicopter. In such an environment, the user of the night vision device depends heavily on the quality of the night vision image provided to gain a sense of depth perception. Understandably, when the night vision scopes wobble on their support frame the quality of image provided to the user is greatly compromised.

Another deficiency of the conventional ANVIS 6 type of night vision device relates to the short life and deterioration of the bellows type of dust seals. When these seals deteriorate sufficiently they allow entry of dust into the interpupillary adjustment mechanism. This environmental dust along with the original grease lubrication forms a kind of abrasive paste, which very quickly causes great wear in the monocular mounts and their respective threaded support shafts. Of course, such wear aggravates the already wobble-prone support of the monocular mounts so that the quality of image provided to a user is very poor, especially in a high vibration environment.

SUMMARY OF THE INVENTION

In view of the above, a primary object of the present invention is to provide an ANVIS type of binocular night vision device with a pair of night vision monocular scopes of much improved stability on their support frame.

Particularly, the inventors have discovered that the original grease lubrication of the interpupillary adjustment mechanism is unnecessary. In fact, if this grease lubrication is deleted, the bellows type of dust seals can also be eliminated. With the elimination of the grease and bellows seals, the interpupillary adjustment mechanism is operated dry, without lubrication. Thus, environmental dust which does enter the interpupillary adjustment mechanism is not trapped in adhesive grease, and can fall out of the downwardly open frame. In fact, operation of the mechanism dry insures that any environmental dust which does enter the mechanism remains dry, so that operation of the interpupillary adjustment mechanism tends to dislodge the dry dust and allow its fall out of the mechanism. In other words, an ANVIS 6 type of night vision device is provided with a dirt-shedding dry threaded engagement between supportive threaded control shafts of the interpupillary adjustment mechanism and the monocular scope mounts. As a result, environmental dust is not trapped in the mechanism and original clearances are maintained much longer with a desirable improved durability of the wobble-controlling original clearances in the mechanism. That is, the wear to the component parts of the interpupillary adjustment mechanism because of environmental dust, and aggravation of monocular wobble, is greatly reduced.

Further to the above, the applicants have discovered that with the elimination of the conventional grease lubrication, and the elimination of the bellows type dust seals, the monocular mounts of an ANVIS 6 type of night vision device may define a threaded engagement with the threaded support shafts of the interpupillary adjustment mechanism which is almost twice that allowed by the original ANVIS 6. More particularly, the counter bores of the monocular mounts which were originally provided for the receipt of an end portion of the bellows seals may be eliminated and the length of the threaded bore in each mount correspondingly lengthened. The result is a monocular mount having nearly twice as much threaded engagement with its support shaft, and a threaded engagement which extends much further to each side of the supported monocular night vision scope. Accordingly, wobble of the supported night vision monocular scopes relative to their support frame is much reduced.

Additional objects and advantages of the present invention will be apparent from a reading of the following description of a particularly preferred exemplary embodiment of the invention taken in conjunction with the following drawing Figures, in which:

DESCRIPTION OF THE DRAWING FIGURES

Figure 6A:
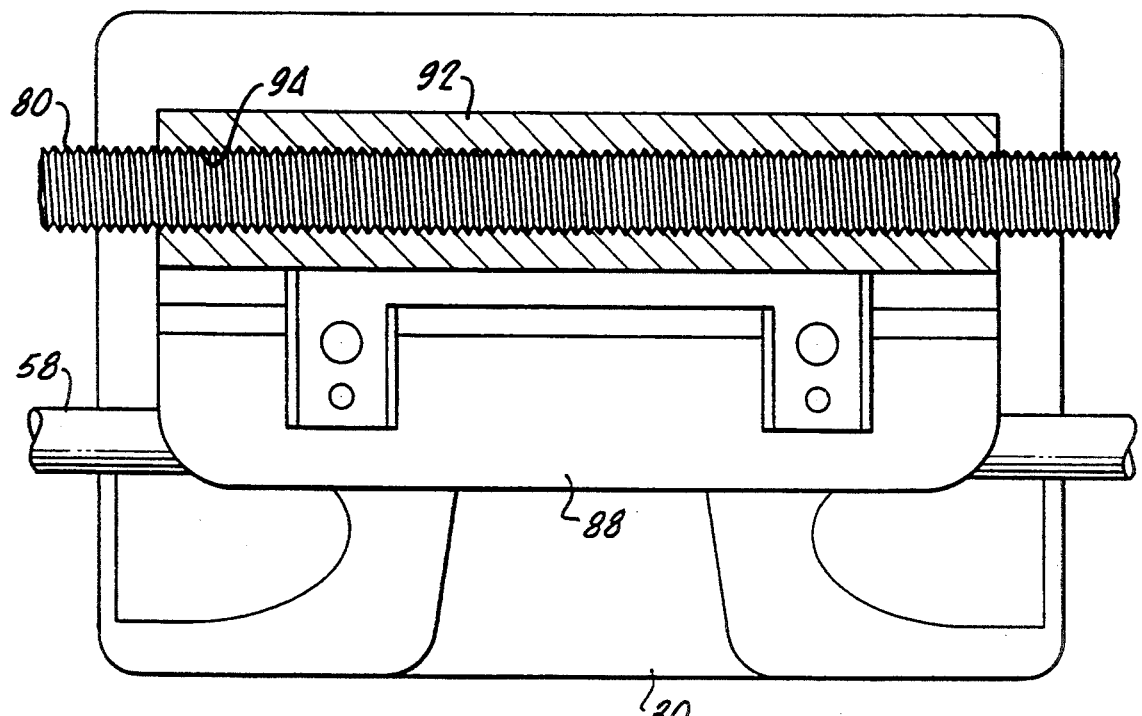
Figure 6B:
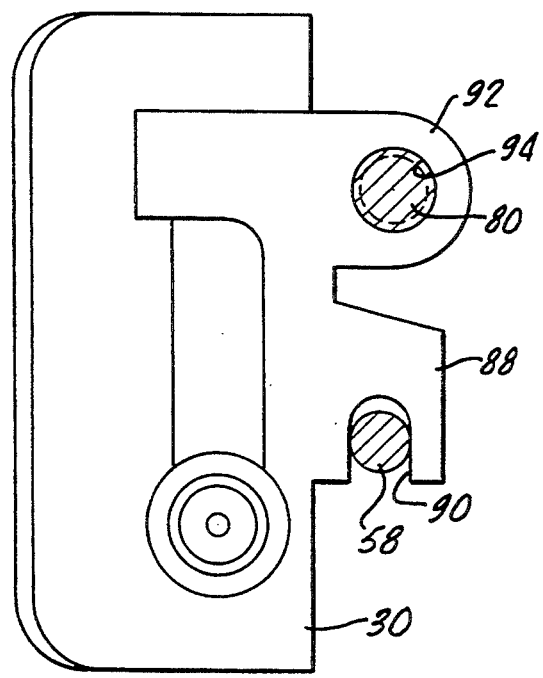

FIGS. 6A and 6B provide respective side elevation and plan views of a component part of the night vision device seen in the other drawing Figures, and are presented at a much enlarged scale to better illustrate salient features of the invention.

DESCRIPTION OF A PREFERRED EMBODIMENT

Figure 1:
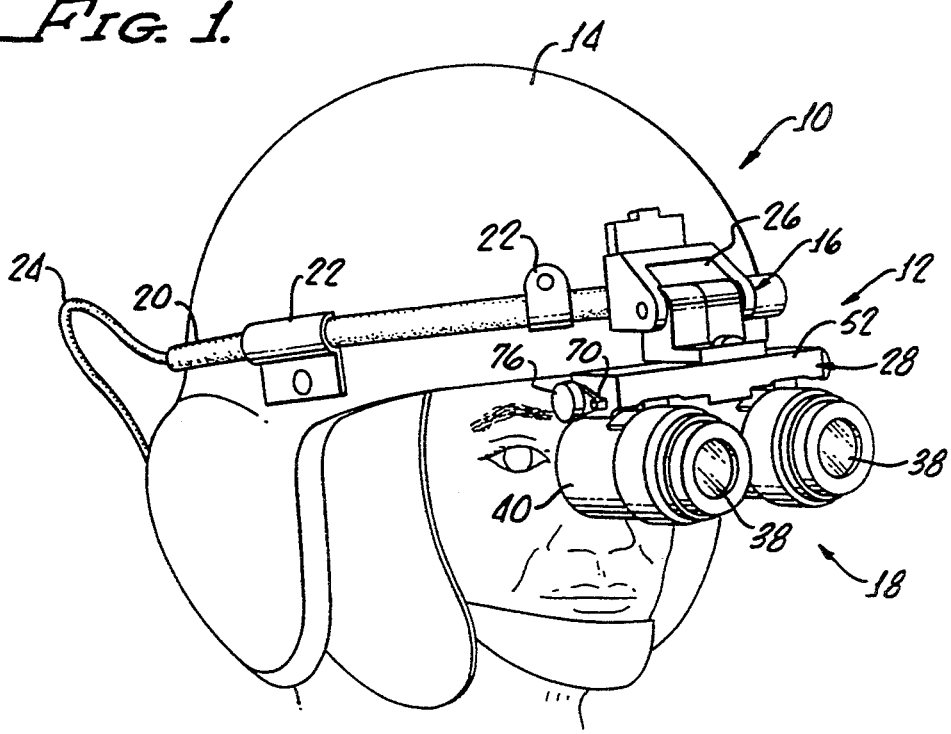
FIG. 1 is a fragmentary perspective view of a human wearing a helmet upon which is carried a night vision device.

FIG. 1 shows a human 10 wearing a night vision system 12 which includes a helmet 14, a night vision device mount 16, and a night vision device 18. The night vision device mount 16 includes a halo-like structure 20 which is secured to the helmet 14 by plural spaces apart brackets 22. A power source (not shown) is connected with the mount 16 by a cable 24, and provides electrical power to operate the night vision device 18. Mount 16 also includes a centrally located bracket 26 which provides for vertical adjustment of the night vision device 18 relative to the helmet 14. Those ordinarily skilled in the pertinent arts will recognize that the helmet 14 is only one of several alternative support devices which the user 10 may employ to support the night vision device 18 in front of the user's eyes. For example, the user could just as well use a face plate or skull pad type of support device, both of which are well known in the pertinent arts and fully an equivalent for the helmet in respect to support of the night vision device 18.

The night vision device 18 includes a frame 28 which secures to and depends from the central bracket 26. This frame 28 is of laterally elongate rectangular shape in plan view, and is also of generally rectangular shape in both frontal and side elevation views. Depending from the frame 28 is a pair of spaced apart mounts 30 (best seen viewing FIG. 2), which at their lower extent define saddle-shaped receptacles 32 for receiving the cylindrical outer surface 34 of respective night vision monocular scopes 36. As FIGS. 1 and 2 in conjunction depict, the night vision monoculars 36 at their forward ends each include an objective lens 38 by which low level light from a night-time scene is received. At their aft ends, the night vision monocular scopes 36 each include a respective eyepiece 40 from which they provide to the user 10 an intensified image of the night-time scene.

Figure 3:
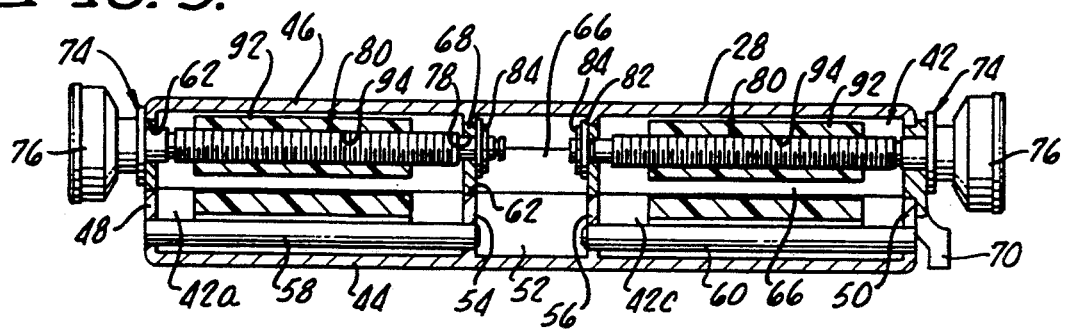
FIG. 3 is a partial cross sectional view taken along line 3—3 of FIG. 2.

In order to allow adjustment of the horizontal spacing between the monocular scopes 36 to match the interpupillary distance of the user 10, as well as allowing tilting of these scopes together in a vertical plane, the frame 28 defines a downwardly open recess 42, which is best seen viewing FIG. 3. This recess 42 is cooperatively defined by front, back, left, and right side walls, referenced with the numerals 44, 46, 48, and 50, respectively, which depend vertically from a top wall 52. A pair of centrally located and spaced apart interior partition walls 54, 56 divide the recess 42 into subparts which are referenced with the numerals 42a, 42b, and 42c.

Near the front of the frame 28, the partition walls 54, 56, in respective cooperation with the side walls 48, 50 carry a pair of slide and pivot shafts 58, 60, in the recess parts 42a, and 42c. In order to illustrate that each of the side walls 48, 50, and partition walls 54, 56, defines a respective one of four aligned bores (each referenced with the numeral 62), the side wall and partition wall at the left side of the frame 28 have been sectioned down to these bores as seen in FIG. 3.

Rotatably received in the bores 62 is an elongate eccentric bushing member 64. This bushing member 64 includes a thin elongate blade portion 66, and four eccentric bushing portions, each referenced with the numeral 68. The bushing portions 68 are received rotatably in the bores 62. To locate the bushing member 64 laterally in the frame 28, a pivot lever portion 70 of the bushing member 64 extends outwardly of the frame 28, and defines a shoulder 72 bearing externally on the side wall 50. A flange portion 74 of a right-side control knob assembly 76R captures the pivot lever 70 between the flange portion 74 and the wall 50. Similarly, at the left side of frame 28, a flange portion 74 of a respective left-side control knob assembly 76L bears against the left side wall 48. Consequently, the eccentric bushing member 64 can not move out of the bores 62.

Rotatably received in respective left and right pairs of the bushing portions 68 of the bushing member 64 at aligned bores 78 thereof is a pair of essentially identical control shaft assemblies 80L and 80R. These control shaft assemblies respectively include the control knobs 76L and 76R. The aligned bores 78 are located eccentrically with respect to the bushing portions 68. In the recess portion 42b, each control shaft assembly 80 carries a washer member 82 which is secured axially on the control shaft by an E-type of retaining ring 84. In order to control friction levels in the mechanism, the washers 82 are preferably made of a polymer material with an inherently low coefficient of friction and good dry lubricity. Preferably, the washers 82 are fabricated of polytetrafluoroethylene, commonly known under the name, Teflon. Alternatively, a Nylon, Delrin, or other type of lubricous polymer material may be used in making the washers 82. The washer members 82 bear on the respective bushing portion 68 of the bushing member 64 to prevent the control shaft assemblies 80 from moving outwardly of the bores 78.

Figure 4:
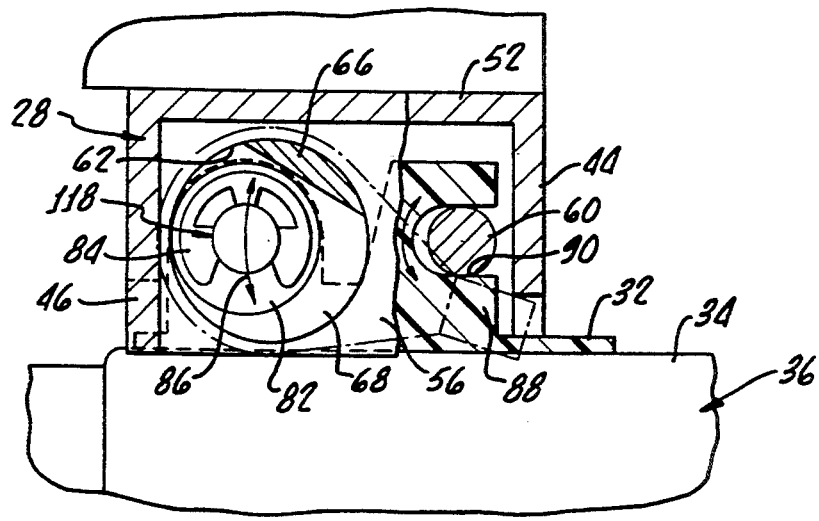
FIG. 4 is a cross sectional view taken at line 4—4 of FIG. 3.

Additionally, the washer members 82 are of sufficient diameter that they bear also on the respective partition walls 54, 56, to prevent the eccentric bushing member 64 from moving laterally in the frame 28. Consequently, lateral forces on the control shaft assemblies are transferred by the flanges 74 and washers 82 to the respective side and partition walls, and the eccentric bushing member 64 need not transfer these lateral forces through the thin elongate blade portion 66. However, it should easily be understood that the entire eccentric bushing member 64 is rotatable in the frame 28 in order to move the control shaft assemblies together through an arcuate path 86, which is best seen viewing FIG. 4. The thin elongate blade portion 66 of the eccentric bushing member 64 is easily able to sustain the torque required for this pivotal movement, and a pin portion (not shown) extends from the pivot lever 70 into an arcuate slot of the frame 28 to limit the extent of this pivotal movement to about eighty degrees of arc.

As is best understood by viewing FIGS. 3, 4, 5, and 6 in conjunction, the night vision device 18 includes a pair of essentially identical mounts 30 which are slidably movable and are pivotal in the frame 28 on the slide and pivot shafts 58 and the control shaft assemblies 80. That is, each mount 30 includes a forward laterally elongate boss portion 88 which defines a laterally elongate and forwardly opening slot 90. The bosses 88 are slidably and pivotally received on the respective one of pins 58, 60 to allow substantially only sliding and pivoting motion relative to the frame 28. In other words, the fit of pins 58, 60, in the slots 90 is sufficiently close that little side to side wobble of the mounts 30 occurs at this location.

Rearwardly of the boss 88, each mount 30 includes a rear boss 92, which defines a laterally extending threaded bore 94 threadably receiving the control shaft assembly 80 at a thread defining portion 96 of the latter. In contrast to the conventional ANVIS 6 type of night vision device which includes end counter bores so that a stepped bore threaded only in its center portion is defined, the bores 94 are of constant diameter throughout their length. Also, the full length of the bores 94 is threaded and threadably engages the shaft assembly 80. Because each of the control shaft assemblies 80 are substantially identical, the bores 94 are each provided with a thread of the same hand. In order to provide universal applicability of the monocular mounts 30, the bases 94 are also provided with a thread of the opposite hand. Preferably, the hand of the thread portion 96 and of bore 94 is right-handed with six thread starts. Thus, it is easily understood that the mounts 30 are movable laterally for interpupillary positional adjustment by rotation of the respective control knob 76. Additionally, the mounts 30 are pivotal together by pivoting of the lever portion 70. Because of the presence of both right and left hand threads in the bases 94, the wobble problems created by clearances of these threads on the threads 96 of the control shafts 80 are aggravated.

Figure 5:
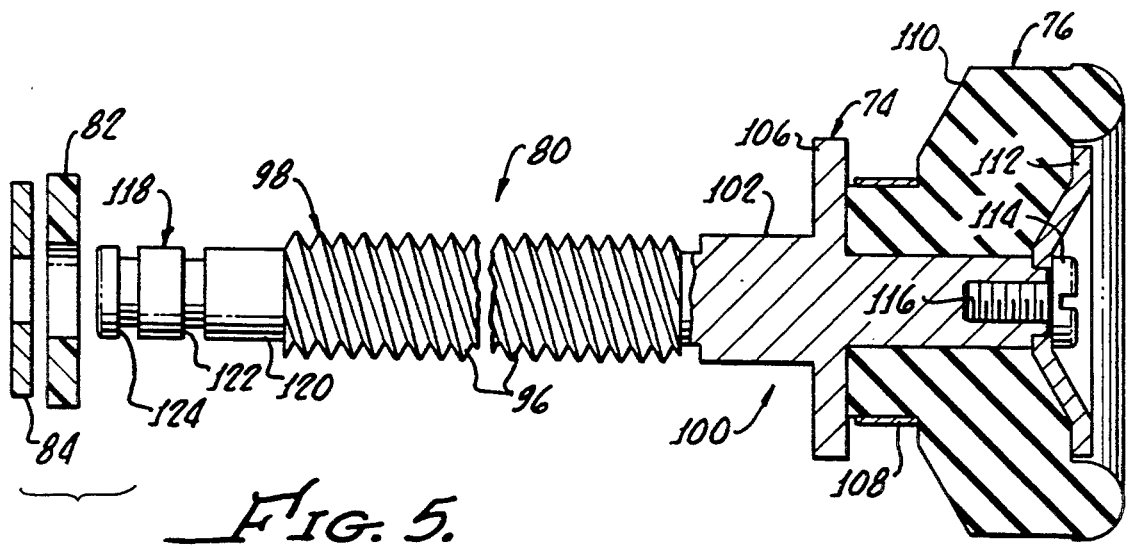
FIG. 5 is an exploded and partially cross sectional view of components of the device seen in the other drawing Figures, and is presented at a considerably enlarged scale in order to better depict details of construction.

Attention now to FIG. 5 in particular will show that each of the essentially identical control shaft assemblies 80 includes an elongate shaft portion 98 which defines the thread portion 96. The thread portion 96 of each of the control shaft assemblies 80 defines a multi-start thread of the same hand so that the mounts 30 on both the left and right side of the frame 28 are essentially the same. That is, these mounts are made to the same design and include bores 94 threaded with the same hand of multi-start thread to match the thread portions 96 of the control shaft assemblies 80. Adjacent to one end of the thread portion 96, the shaft portion 98 includes an integral collar 100 of enlarged diameter and defining both a bearing surface 102 which is rotatable in a respective one of the bores 78 of eccentric bushing member 64, and a shoulder 104 against which a washer member 106 is captured. The washer member 106 defines the flange portion 74 for the control knob assembly 80. The remaining parts of the control knob assembly 80 include a spacer 108 which is interposed between the washer member 106 and a molded elastomer traction disk 110. This traction disk along with a retaining member 112 and the engagement of the traction disk with spacer 108 provides torque transfer from a user's fingers to the shaft portion 98. A screw 114 is threadably received into an axial bore 116 to capture the washer member 106, spacer 108, traction disk 110, and retention member 112, on the shaft portion 98. At its end opposite the control knob assembly 80, the control shaft portion 98 defines a reduced diameter stem portion 118. This stem portion 118 defines a bearing surface 120 which is rotatably received in a respective one of the bores 78 of the bushing member 64. Beyond the bearing surface 120, the stem portion 118 defines a pair of spaced apart grooves 122, 124, either one of which may receive the E-ring clip 84.

In order to compensate for the thickness of the lever portion 70 of the bushing member 64 at the right-hand side of the frame 28, the control shaft assembly 80 is installed with the E-ring clip 84 in the groove 124. On the other hand, on the left-hand side of the frame 28, an identical control shaft assembly 80 is installed with the E-ring clip 84 in the groove 122. Thus, the identical control shaft assembly by its configuration allows its installation in either one of two alternative configurations. Also, the control shaft assemblies 80 are identical on each side of the frame 28 so that the mounts 30 may also be the same. The result is a significant decrease in the manufacturing costs for the night vision device 18, as well as a reduction in the number of different parts required to be kept on hand for maintenance and service of the device.

In view of the above, it is easily understood that the interpupillary distance defined between the centers of the eyepieces 40 is adjustable by turning the control knobs 76. Additionally, this interpupillary distance need not be symmetrically arranged on either side of the center of the frame 28. That is, if the user 10 wishes, the interpupillary distance between the monocular scopes 36 may be asymmetrical relative to the frame 28 and the helmet or face plate which the user wears to support the night vision device. Thus, in those instances where the helmet or other support device does not repose in a position centered with respect to the user's eyes, the user nevertheless can achieve a satisfactory positioning of the monocular scopes 36, and resulting binocular vision. In order to assist the user in this respect, the frame 28 at its rear surface (best seen in FIG. 2) defines respective left-eye and right-eye indicia, indicated with the arrowed reference numeral 126, while the mounts 30 include an index mark 128. By use of these indicia and marks, the user 10 may adjust the interpupillary distance and non symmetrical disposition of the scopes 36 relative to the frame 28.

Figure 2:
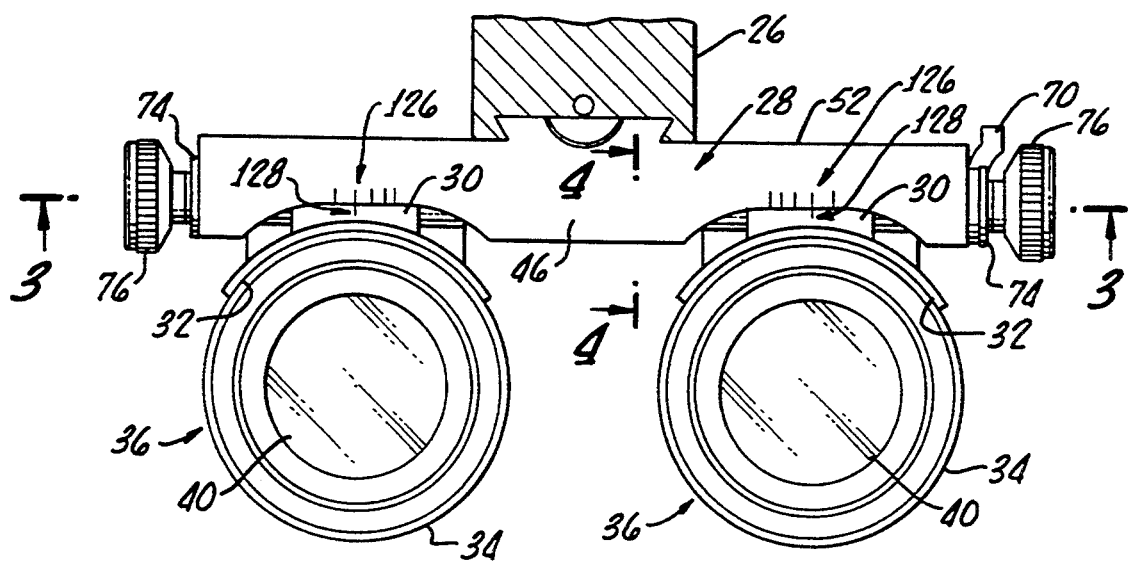
FIG. 2 is a rear view of the night vision device seen in FIG. 1.

Now viewing FIGS. 2 and 6 in conjunction, it is seen that the mounts 30 may wobble from side to side relative to the frame 28, as is indicated by the arrow 130 seen in FIG. 2, dependent upon the accumulation of clearances between the various components of the interpupillary adjustment mechanism. Experience has shown that by far the most troublesome accumulation of clearance in the interpupillary adjustment mechanism occurs at the interface of the threaded control shafts 80 and the threaded bores 94 of the mounts 30. Conventionally, an ANVIS 6 provides a length of threaded engagement between the mounts 30 and the shafts 80 of about 0.710 inch. FIG. 6A illustrates that the present improved ANVIS night vision device eliminates the conventional dust seals, eliminates the conventional and dust trapping grease lubricant, operates the interpupillary adjustment mechanism dry to release environmental dust, and consequently also provides mounts 30 with a boss 92 having a threaded bore 94 of constant diameter, fully threaded throughout its length, and extending the full width of the mount 30.

In other words, a dirt-shedding dry threaded engagement is provided between the shafts 80 and the mounts 30. Importantly, the recess 42 of frame 28 opens downwardly so that environmental dirt which is shed from the interpupillary adjustment mechanism in response to threading adjustment of the mounts 30 along the shafts 80 can fall freely from the mechanism. The bosses 92 further each provide a threaded engagement with the shafts 80 which is about 1.2 inches wide. With equal clearances between the shafts 80 and the bosses 92, the wobble 130 possible at the center of the monocular scopes 36 is reduced to about half the conventional level. Consequently, the quality of image provided to a user of the night vision device 18 is greatly improved. Additionally, the present inventive improved ANVIS 6 type of night vision device maintains its wobble-free nature much longer under dusty use conditions because it is dry and does not trap environmental wear-causing dust in the mechanism.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A binocular night vision device comprising:
a frame supported relative to a user's head and eyes;
said frame including means for supporting a pair of night vision monocular scope mounts for lateral relative movement;
said pair of monocular scope mounts carrying a respective left-eye and right-eye night vision monocular scope disposed in front of respective eyes of said user for cooperatively providing binocular vision;
said frame carrying means for laterally moving and positioning said pair of monocular scope mounts relative to said frame, said moving and positioning means including a laterally-extending threaded shaft member journaled by said frame and threadably associated with one monocularscope mount of said pair of monocular scope mounts to move said one scope mount laterally of said frame in response to rotation of said shaft member;
said monocular scope mount including a laterally extending boss defining a laterally extending bore of substantially constant diameter threadably receiving said threaded shaft member, and said boss threadably engaging said shaft over the entire lateral extent of said boss.

2. The night vision device of claim 1 wherein said scope mount and said threaded shaft member define a dust-shedding dry threaded engagement therebetween.

3. The night vision device of claim 2 wherein said frame defines a recess open downwardly and allowing environmental dust shed from said threaded shaft member and scope mount to fall freely therefrom.

4. The night vision device of claim 1 wherein said night vision device is an ANVIS 6 type.

5. The night vision device of claim 1 wherein said threaded shaft member is threadably associated with each one of said pair of scope mounts to move the latter in opposite lateral directions in response to rotation of said threaded shaft member.

6. An ANVIS 6 type of binocular night vision device comprising a frame supported relative to a user's head and eyes, a pair of night vision monocular scopes depending from said frame in front of the user's eyes, and means for interpupillary distance adjustment of said pair of monocular scopes relative said frame, said adjustment means including a threaded shaft carried by said frame, and a monocular scope mount threadably engaging and supported by said threaded shaft, said threaded shaft and scope mount defining a dust-shedding dry threaded engagement.

7. The ANVIS 6 type of binocular night vision device of claim 6 wherein said frame below said threaded shaft is downwardly open to the environment to allow shed environmental dust to drop from said threaded and scope mount in response to movement of said scope mount along said shaft.

8. The ANVIS 6 type of binocular night vision device of claim 6 wherein said scope mount defines a laterally extending boss defining a lateral bore threadably engaging said threaded shaft, said lateral bore extending the full lateral extent of said boss.

9. The ANVIS 6 type of binocular night vision device of claim 8 wherein said threaded bore of said scope mount boss is of substantially constant diameter substantially throughout its lateral length.

10. The ANVIS 6 type of binocular night vision device of claim 9 wherein said scope mount boss has a lateral length of substantially 1.2 inches, and said threaded bore threadably engages said threaded shaft over substantially the entire length of 1.2 inches.

11. A binocular night vision device including a frame adapted to be suspended relative to a user's head and eyes, and from which frame depends a pair of laterally movable scope mounts, each of the scope mounts carrying a respective monocular night vision scope cooperatively providing binocular night vision, the frame carrying a laterally extending threaded shaft threadably engaging at least one of said pair of scope mounts to move the latter laterally for interpupillary adjustment in response to rotation of the threaded shaft, and said threaded shaft being open to the environment to shed environmental dust therefrom in response to lateral movement of said scope mount therealong.

12. The night vision device of claim 11 wherein said one scope mount and said threaded shaft define a dust-shedding dry threaded engagement.

13. The night vision device of claim 12 wherein said one scope mount includes a laterally extending boss defining a lateral bore threadably engaging said threaded shaft over substantially the entire lateral length of said bore.

14. The night vision device of claim 13 wherein said laterally extending bore of said one scope mount is of substantially constant diameter over its entire lateral length.

15. The night vision device of claim 11 wherein said device is of the ANVIS 6 type.

16. The ANVIS 6 type of binocular night vision device of claim 15 wherein said laterally extending boss is of substantially 1.2 inches in lateral dimension.

17. The ANVIS 6 type of binocular night vision device of claim 16 wherein said laterally extending bore of said one scope mount threadably engages said threaded shaft over a length of substantially 1.2 inches.

* * * * *